United States Patent Office 2,783,283
Patented Feb. 26, 1957

2,783,283

HYDROGENOLYSIS OF DIALDEHYDE STARCH TO ERYTHRITOL AND ETHYLENE GLYCOL

John W. Sloan, Bernard T. Hofreiter, Charles L. Mehltretter, and Ivan A. Wolff, Peoria, Ill., assignors to the United States of America as represented by the Secretary of Agriculture No Drawing. Application November 25, 1955, Serial No. 549,206

12 Claims. (Cl. 260—635)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to an improved method for making polyols from dialdehyde starch. More specifically, the invention concerns a process wherein an aqueous dispersion of dialdehyde starch is subjected to hydrogen under pressure in the presence of a hydrogenation catalyst to obtain combined hydrogenation and hydrolysis thus to yield a product containing erythritol and ethylene glycol. A particular object of the invention is the provision of methods whereby a concentrated aqueous dispersion of dialdehyde starch may be successfully subjected to such combined hydrogenation and hydrolysis thus to obtain erythritol and ethylene glycol in an efficient and economical manner. Further objects, advantages, and features of the invention will be obvious from the description herein.

The compound, dialdehyde starch, is a polymer in which a majority of the repeating units have the formula

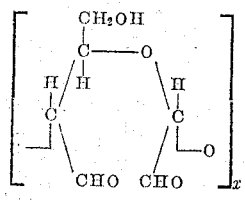

in which $x$ represents the number of repeating units in the molecule and may range from as low as 100 or less to many thousand. The terminal groups of the molecule differ slightly from the structure shown but are relatively so few in number as to have no significant effect on the production of the desired polyols of this invention.

The value of $x$ in any one instance will depend both upon the particular substance as it existed prior to the introduction of the aldehyde (—CHO) groups and upon the extent of depolymerization or degradation resulting from prior treatments the substance has undergone, as for example, the oxidation process. The prior substance is, in any event, a starch material. The compound of the formula is an oxidation derivative of starch, and the value of $x$ is the degree of polymerization of the derivative.

The compound of the formula is well known to carbohydrate chemists. It has been variously termed in the literature, and has frequently been designated as "dialdehyde starch." One of the best known methods for making it is through the oxidation of starch with periodic acid or its salts. It has hence frequently been termed "periodate oxidized starch."

One method for its production is described by Dvonch and Mehltretter, J. Am. Chem. Soc. 74, 5522 (1952), and in U. S. Patent No. 2,648,629. The method involves the electrolytic production of periodate in situ as needed during the oxidation.

Dialdehyde starch has been reduced prior to our work to a polyol either catalytically or by means of sodium borohydride. The resulting polymeric polyol, in turn, has been hydrolyzed in mineral acid solution to give erythritol. This prior technology, while providing a method for producing erythritol, is nevertheless tedious and expensive. Moreover, by its nature it would be expected to give lower yields of erythritol than the process we describe here. The nature of the two-step process mentioned is such as to produce considerable quantities of low molecular weight aldehydes such as glycollic aldehyde which could condense with erythritol to form acetals or similar compounds undesirable from the standpoint of lowered erythritol yield as well as necessitating more complicated recovery procedures. As a consequence, dialdehyde starch has not heretofore been regarded as a potential source material for practical quantities of erythritol.

Erythritol is a polyol of similar structure to glycerol and sorbitol, and it has many uses as a humectant, as a base material for the preparation of non-ionic surface active agents, and as a plasticizer. It is also a potentially useful raw material in the preparation of artificial drying oils. When esterified with unsaturated fatty acids, it should be particularly useful in the latter field.

In the copending patent application of John W. Sloan and Ivan A. Wolff, Serial No. 496,958, filed March 25, 1955, there is disclosed a process wherein dialdehyde starch is subjected to hydrogen under superatmospheric pressure in the presence of a hydrogenation catalyst. In this process a combined hydrogenation and hydrolysis occurs with the formation of a mixture of erythritol and ethylene glycol. One of the problems associated with this hydrogenation procedure is that to get good contact between the reactants it is necessary to apply the dialdehyde in the form of an aqueous dispersion. However, dialdehyde starch does not dissolve nor disperse readily in water so that the solids content of the dispersion is limited to a maximum level of about 2 percent. If aqueous dispersions of substantially higher solids content are used, they exhibit such a high viscosity or even a pasty character that contact between reactants is decreased with a resulting poor yield of end products. Also charring and other undesirable side effects occur. It is obvious that the use of a dialdehyde starch dispersion of low solids content does not make the best use of the available equipment and is thus relatively inefficient and uneconomical.

It has now been found that if dialdehyde starch is initially subjected to treatment with an alkaline compound it can then be formed into a dispersion having a solids content of as high as 50 percent and that such dispersion exhibits a mobile, highly-fluid character so that when this dispersion is applied to the hydrogenation process, good contact between reagents is obtained, the dispersion does not coat the sides of the reaction vessel nor the particles of catalyst and no charring or other undesirable side effects occur. Also, erythritol and ethylene glycol are produced in yields comparable with those obtained in the prior procedure operating on dilute dispersions of the starting material. Since, in accordance with this invention, the hydrogenation can be conducted on a concentrated dispersion of dialdehyde starch, greater efficiency is obtained in that 20 to 25 times as much material may be hydrogenated in a vessel of the same size and using the same amount of hydrogen and catalyst. Another advantage of the process of this invention is that the product is in a concentrated solution so that less water need be evaporated to recover the erythritol and ethylene glycol.

As noted briefly above, the dialdehyde starch is initially treated with an alkaline substance to render it capable of forming a concentrated, yet mobile, aqueous dispersion. Various methods may be employed to effectuate this treatment. Generally, the dialdehyde starch is commingled with an aqueous solution of the alkaline substance employing agitation to produce a uniform solution or suspension of the starch derivative in the aqueous media. The proportions of dialdehyde starch and water are so selected that the dispersion formed contains about from 10 to 50 percent of dialdehyde starch. The dispersion treatment may be conducted at room temperature (20 to 25° C.), or, to expedite the treatment, the temperature may be raised to about 50 or 60° C. The behavior of the dialdehyde starch in the dispersion treatment will depend to some extent on the type of starch it was made from, its molecular weight and particularly on its age. Thus it has been observed that the freshly prepared material tends to form a solution in the aqueous alkaline solution whereas an aged material will tend to resist solution and more generally form a suspension or slurry. Where an aged material is employed, it may be desirable, but is not essential, to employ a larger proportion of alkaline material, a higher temperature, a longer period of agitation, or combinations of these to cause the dispersion. It is to be noted that it is immaterial, from the standpoint of this invention, whether the dialdehyde starch forms a solution or a suspension in the aqueous alkali as in either case the resulting dispersion is directly, or especially after addition of acid as required for the hydrogenation, in a mobile, highly-fluid condition affording an advantageous condition for contact with the hydrogenation reagents. It is also to be noted that the term "dispersion" is used herein as being generic to both solutions and suspensions.

The nature of the alkaline material used for forming the dispersion is not critical as long as it forms hydroxyl ions in solution. Sodium hydroxide and calcium hydroxide are preferred but examples of other agents which may be used are sodium carbonate, barium hydroxide, strontium hydroxide, potassium carbonate, potassium hydroxide, quaternary ammonium hydroxides and mixtures of these. The amount of alkaline material required for the dispersion will vary depending on such factors as the age of the dialdehyde starch, the temperature and time used in the dispersion, the nature of the alkaline material, and so forth. In many cases a proportion of alkaline material equivalent to about from 0.25 to 1 percent of sodium hydroxide, based on the weight of dialdehyde starch, gives good results. The proper amount of alkali to use in any particular case can be readily determined by observation of the mixture of dialdehyde starch, water and alkali. Thus when the proper amount of alkali is used the dialdehyde starch will form a thin dispersion within a few minutes after starting agitation or soon after acid is added to neutralize the alkali.

In dispersing the dialdehyde starch in the alkaline solution, it is generally preferred to short-stop the treatment after a time period not to exceed about 15 minutes, preferably not to exceed 5 minutes by the addition of an acid to the point of neutrality or acidity. By so limiting the time of contact of the dialdehyde starch and alkali, excessive degradation and other undesirable transformations in the dialdehyde starch are prevented. The limited amount of modification caused by the alkali treatment does not impair the subsequent hydrogenation process nor change the nature of the products obtained.

After having prepared the dispersion of the dialdehyde starch in the aqueous alkali, the resulting dispersion is subjected to the hydrogenation procedure which essentially involves contacting the dispersion with hydrogen under superatmospheric pressure in the presence of a hydrogenation catalyst. Thereby there occurs a simultaneous hydrogenation of the aldehyde groups, hydrolysis of the polymer and subsequent hydrogenation of the newly-formed aldehyde groups thus yielding a mixture of erythritol and ethylene glycol. Details of the hydrogenation procedure are set forth below.

The reaction is conducted under neutral or acidic conditions, preferably at a pH of about 3 to 6. In the preferred method of procedure the pH of the dispersion is adjusted to 3 to 6 and maintained at this level throughout the reaction by initially adding a cation exchange resin. For adjusting the dispersion to an acidic pH any mineral acid may be used such as hydrochloric, sulphurous, sulphuric, phosphoric, hydrobromic, etc. The cation exchanger prevents the mixture from becoming alkaline by adsorbing sodium ions or whatever cations were present in the alkaline material used in the dispersion step. The cation exchange may be, for example of the sulphonated coal, sulphonated polystyrene or sulphonated phenol-formaldehyde resin types and is in the hydrogen form when added to the reaction mixture. The proper amount of exchanger to use can, of course, be calculated by stoichiometry based on the amount of alkaline material in the dispersion.

The temperature of the hydrogenation reaction is a critical element in the process of this invention and one must employ temperatures within the range of 150 to 230° C. These temperatures are considerably higher than the minimum required for catalytic reduction of the original aldehyde groups. For best results it is preferred to employ temperatures of 180 to 200° C.

Other conditions of the reaction are not critical provided the conventional conditions of catalytic hydrogenation are maintained and they are not affected by the improvement. For example, the pressure employed may vary over a wide range, consideration being given the usual interdependence between type of catalyst and the pressure required. For example, the minimum operative pressures for base metal catalysts, such as Raney nickel and copper chromite, are somewhat higher than those for noble metal catalysts such as supported platinum or palladium. For reasons of convenience we employ Raney nickel, suspending a small amount in the mixture prior to hydrogenation. The reaction is carried out in a pressure vessel, which is brought to reaction temperature by internal or external heating means. Gaseous hydrogen is introduced in an amount at least sufficient to effect the theoretical molecular transformation of the six-carbon units of the dialdehyde starch molecule into erythritol and ethylene glycol.

The time of reaction may also vary over a wide range but is not necessarily affected by the use of starting mixtures having a high concentration of dialdehyde starch. It is dependent somewhat on temperature in the usual inverse relationship. At temperatures within the high part of the designated range, less time is required. The top limit of reaction time for practical purposes may be considered as 12 hours; the lower limit may depend partly on the activity of the catalyst as well as on temperature and in the case of a continuous process would preferably be less than one hour.

The reaction mixture is agitated during the reaction period of 1 to 12 hours, then the products are recovered by separating the catalyst from the solution and recovering erythritol and ethylene glycol by known methods. The former may be separated by evaporation and crystallization and the latter by fractional distillation of the mother liquor.

The invention is further demonstrated by the following examples which are given only by way of illustration and not limitation.

EXAMPLE I

Dialdehyde corn starch, prepared in accordance with the method of Dvonch and Mehltretter, previously noted, was found analytically to be comprised of dialdehyde units to the extent of 94 to 100 percent. The Raney nickel catalyst was prepared according to Pavlic and Adkins, J. Am. Chem. Soc. 68, 1471 (1946).

To 20 grams of dry powdered freshly prepared dialdehyde corn starch in a beaker was added 25 ml. of saturated aqueous Ca(OH)$_2$ (approximately 0.04 N) and the mixture vigorously stirred. The initial slurry thickened in a few seconds and within 3-4 minutes became a moist, lumpy solid. With continued stirring and warming on a steam bath to 50°-60°, the mass glazed, softened, and then quickly formed a light yellow mobile solution. A few drops of sulfuric acid were added to reduce the pH below 7 and the solution was cooled to room temperature. The pH was then adjusted to 3.2 with sulfuric acid and the solution (approximately 40 percent solids concentration) was transferred to the high pressure reaction vessel. Ten grams, moist weight, of Raney nickel catalyst stored under absolute ethanol and 5 g., moist weight, of Dowex-50, a sulphonated polystyrene cation exchanger (in the acid form) were added, the vessel was sealed, and hydrogen admitted to 1,700 p. s. i. Agitation was started and the temperature was raised to 200° C. and held at that temperature for 2 hours. The vessel was then cooled, vented, and opened. The products were recovered by filtering off the catalyst and resin, washing them with boiling water, and combining filtrate and washings. An assay of the product solution (pH 6.0) showed the presence of erythritol to the extent of 61 percent of that theoretically obtainable.

EXAMPLES II TO VI

This Example II illustrates the handling of a sample of dialdehyde corn starch that had changed somewhat during storage for several months after preparation.

To 20 grams of dry powdered dialdehyde corn starch (prepared several months previously) in a beaker was added 25 ml. of 0.1 N NaOH solution and the mixture vigorously stirred. The slurry failed to thicken as neutralization of the alkali was started by adding 5 N H$_2$SO$_4$ dropwise at room temperature. When the pH reached the vicinity of 7, the slurry thickened to a consistency that would not pour but as soon as the pH was reduced further, the viscosity decreased to that of a mobile slurry at pH 4.6. At this point, the mixture was transferred to the high pressure reaction vessel, 10 g., moist weight, of Raney nickel catalyst and 5 g., moist weight, of Dowex-50 resin were added, and vessel filled hydrogen. The reaction temperature was 180° and the time was 4 hours. The pH of the solution of products was 6.1 and the erythritol yield was 62 percent of theory.

Other examples appear in Table I. These hydrogenation runs were all carried out at 180° for 4 hours and all contained Dowex-50 except Example III.

Table I

| Example | Initial pH | Final pH | Erythritol Produced, Percent Theory | Remarks |
| --- | --- | --- | --- | --- |
| III | 7.8 | 8.5 | 34 | No pH adjustment. |
| IV | 4.8 | 6.2 | 55 | NaOH-solubilized starting material. |
| V | 4.6 | 6.1 | 62 | NaOH-slurried starting material. |
| VI | 5.9 | 6.0 | 60 | Ca(OH)$_2$-solubilized starting material. |

Example III shows the lowered yield of erythritol resulting from an alkaline reaction mixture. Much better yields were obtained in the other runs where the pH was controlled below 7. Good yields of desired polyol were obtained in both IV and V: The former run was made with freshly prepared dialdehyde starch which dissolved on treatment with dilute NaOH, the latter run was made with the same starting material after several weeks' storage in the solid state. It did not dissolve when treated with dilute NaOH. In Example VI a good yield was obtained with calcium hydroxide pretreatment.

Having thus described the invention, what is claimed is:

1. The method of producing a mixture of erythritol and ethylene glycol which comprises subjecting to hydrogen under superatmospheric pressure an aqueous preparation of alkali-dispersed dialdehyde starch, said preparation having a dialdehyde starch content of 10 to 50 percent yet being in a mobile, highly-fluid state, in the presence of a hydrogenation catalyst at a temperature within the range of 150 to 230° C., maintaining said condition of temperature and pressure for a period of 1 to 12 hours, and separating the reaction product comprising erythritol and ethylene glycol from said catalyst.

2. The process of claim 1 wherein the reaction is conducted at a pH of 3 to 6.

3. The process of claim 1 wherein the reaction is conducted at a pH of 3 to 6 and a cation exchanger material in the acid form is initially added to prevent development of a alkalinity during the course of the reaction.

4. The method of producing a mixture of erythritol and ethylene glycol which comprises dispersing 11 to 100 parts of dialdehyde starch in 100 parts of water containing sufficient alkali to produce a concentrated yet mobile aqueous dispersion of dialdehyde starch and thereafter subjecting said dispersion to catalytic hydrogenation under a superatmospheric pressure of hydrogen.

5. The method of producing a mixture of erythritol and ethylene glycol which comprises dispersing 11 to 100 parts of dialdehyde starch in 100 parts of water containing sufficient alkali to produce a concentrated yet mobile aqueous dispersion of dialdehyde starch, short-stopping the action of the alkali by neutralizing the dispersion, and thereafter subjecting the resulting dispersion to catalytic hydrogenation under a superatmospheric pressure of hydrogen.

6. The method for producing a mixture of erythritol and ethylene glycol which comprises dispersing 11 to 100 parts of dialdehyde starch in 100 parts of water containing about from 0.25 to 1 percent of an alkaline substance, based on the weight of dialdehyde starch, whereby to produce a concentrated yet mobile aqueous dispersion of dialdehyde starch, short-stopping the action of the alkali within a time period not to exceed about 15 minutes by neutralizing the dispersion, and thereafter subjecting the resulting dispersion to catalytic hydrogenation under a superatmospheric pressure of hydrogen.

7. The method of producing a mixture of erythritol and ethylene glycol which comprises dispersing dialdehyde starch in aqueous alkali, neutralizing the alkalinity of the resulting dispersion and subjecting the dispersion to hydrogen under superatmospheric pressure in the presence of a hydrogenation catalyst at a temperature within the range of 150 to 230° C., maintaining said conditions of temperature and pressure for a period of 1 to 12 hours, and separating the reaction product comprising erythritol and ethylene glycol from the catalyst.

8. The method of producing a mixture of erythritol and ethylene glycol which comprises dispersing 11 to 100 parts of dialdehyde starch in 100 parts of water containing an alkaline substance, neutralizing the alkalinity of the dispersion and subjecting it to hydrogen under superatmospheric pressure in the presence of a hydrogenation catalyst at a temperature within the range of 150 to 230° C., maintaining said conditions of temperature and pressure for a period of 1 to 12 hours and separating the reaction product comprising erythritol and ethylene glycol from the catalyst.

9. The method of producing a mixture of erythritol and ethylene glycol which comprises dispersing 11 to 100 parts of dialdehyde starch in 100 parts of aqueous alkali solution, neutralizing the alkalinity of the dispersion within a time not to exceed about 15 minutes and subjecting it to hydrogen under superatmospheric pressure in the presence of a hydrogenation catalyst at a temperature within the range of 150 to 230° C., maintaining said conditions of temperature and pressure for a period of 1 to 12 hours and separating the reaction product comprising erythritol and ethylene glycol from the said catalyst.

10. The process of claim 9 wherein the aqueous alkali solution is an aqueous solution of sodium hydroxide of about 0.1 N concentration and the alkaline dispersion is neutralized within a time period not to exceed about 5 minutes.

11. The process of claim 9 wherein the aqueous alkali solution is an essentially saturated solution of calcium hydroxide and the alkaline dispersion is neutralized within a time period not to exceed about 5 minutes.

12. The method of preparing an aqueous dispersion of dialdehyde starch which comprises commingling 11 to 100 parts of dialdehyde starch, 100 parts of water and 0.25 to 1 percent of an alkaline substance, based on the weight of dialdehyde starch, and adding an acid to render the pH of the mixture neutral to acid, said acid being added not more than about 5 minutes after contacting the 3 materials, whereby to produce a 10 to 50 percent dispersion of dialdehyde starch in a mobile, highly-fluid condition.

References Cited in the file of this patent

UNITED STATES PATENTS

| | | |
|---|---|---|
| 2,335,731 | Bottoms | Nov. 30, 1943 |
| 2,518,235 | Hartstra et al. | Aug. 8, 1950 |
| 2,609,398 | Lolkema et al. | Sept. 2, 1952 |
| 2,609,399 | Kool et al. | Sept. 2, 1952 |
| 2,680,078 | Jarvi | June 1, 1954 |
| 2,702,755 | Chaney | Feb. 22, 1955 |

OTHER REFERENCES

Jackson et al.: Jour. Amer. Chem. Soc., vol. 60, pp. 989–91.

Abdel-Akher et al.: J. A. C. S., vol. 74 (1952), pp. 4970–71.

Abdel-Akher et al.: Nature, vol. 171 (1953), pp. 474–5.

Sloan et al.: J. A. C. S., vol. 76 (1954), pp. 4429–34.

Jeanes et al.: J. Org. Chem., vol. 20 (1955), pp. 1565–8.